US008384340B2

(12) United States Patent
Tarter

(10) Patent No.: US 8,384,340 B2
(45) Date of Patent: Feb. 26, 2013

(54) ELECTRICAL APPLIANCE THAT UTILIZES MULTIPLE POWER SOURCES

(75) Inventor: Kevin J. Tarter, Wichita, KS (US)

(73) Assignee: The Coleman Company, Inc., Wichita, KS (US)

(*) Notice: Subject to any disclaimer, the term of this patent is extended or adjusted under 35 U.S.C. 154(b) by 102 days.

(21) Appl. No.: 12/146,610

(22) Filed: Jun. 26, 2008

(65) Prior Publication Data
US 2009/0001816 A1 Jan. 1, 2009

Related U.S. Application Data

(60) Provisional application No. 60/946,230, filed on Jun. 26, 2007.

(51) Int. Cl.
H02J 7/00 (2006.01)

(52) U.S. Cl. .............. 320/101; 307/65; 307/66

(58) Field of Classification Search ........... 320/101, 320/107; 429/123, 151, 153, 154, 159, 163, 429/177; 307/44, 46, 48, 64, 65, 66
See application file for complete search history.

(56) References Cited

U.S. PATENT DOCUMENTS

| 1,363,132 | A | 12/1920 | Lander et al. |
| 1,875,956 | A | 4/1930 | Thiel |
| 2,608,639 | A | 8/1952 | Packer |
| 2,818,543 | A | 12/1957 | Dodge |
| 2,966,580 | A | 12/1960 | Taylor |
| 2,980,753 | A | 4/1961 | Nolter |
| 3,535,506 | A | 10/1970 | Moore et al. |
| 3,601,595 | A | 8/1971 | Kivela |
| 3,684,583 | A | 8/1972 | Lehnen et al. |
| 3,763,434 | A | 10/1973 | Blesch et al. |
| 3,787,678 | A | 1/1974 | Rainer |
| 3,855,534 | A | 12/1974 | Holcomb et al. |
| 3,881,961 | A | 5/1975 | Nation |
| 3,930,889 | A | 1/1976 | Ruggiero et al. |
| 3,941,618 | A | 3/1976 | Mabuchi |
| 3,990,919 | A | 11/1976 | Krueger |
| 3,999,110 | A * | 12/1976 | Ramstrom et al. ............ 320/112 |
| 4,004,208 | A | 1/1977 | Tamminen |
| 4,008,356 | A | 2/1977 | Asano |
| 4,057,677 | A | 11/1977 | Mabuchi |
| 4,092,580 | A | 5/1978 | Prinsze |
| 4,123,598 | A | 10/1978 | Hammel |
| 4,125,681 | A | 11/1978 | Sjogren |
| 4,140,957 | A | 2/1979 | Rapp |
| 4,179,814 | A | 12/1979 | Montanio |
| 4,205,121 | A | 5/1980 | Naitoh |
| 4,230,777 | A | 10/1980 | Gatto |
| 4,345,304 | A | 8/1982 | Penney et al. |
| 4,383,007 | A | 5/1983 | Murphy |
| 4,389,469 | A | 6/1983 | Nicholls |

(Continued)

FOREIGN PATENT DOCUMENTS

| EP | 0234399 | 2/1987 |
| EP | 0331275 | 9/1989 |

(Continued)

Primary Examiner — Richard V Muralidar

(57) ABSTRACT

An electrical appliance (20) that accepts multiple different self-contained power sources (24, 33). As an example, an electrical appliance may receive a rechargeable battery pack (24) or a power cartridge (33) that is designed to receive disposable batteries (40). If the user does not have sufficient power left in a battery pack (24), the power cartridge (33) may be filled with disposable dry cell batteries (40), and may be inserted in the electrical appliance (20) to provide power. Another self contained power cartridge (44) may include a fuel cell. The fuel cell power cartridge (44) may include removable fuel cell cartridges (48), for example, each having a fuel therein, such as hydrogen.

4 Claims, 2 Drawing Sheets

U.S. PATENT DOCUMENTS

| | | | |
|---|---|---|---|
| 4,397,920 A | 8/1983 | Trattner |
| 4,399,201 A | 8/1983 | Nagahara |
| RE31,458 E | 12/1983 | Tattner |
| 4,428,033 A | 1/1984 | McBride |
| 4,463,283 A | 7/1984 | Penney et al. |
| 4,464,445 A | 8/1984 | Matti |
| 4,468,439 A | 8/1984 | Ohara et al. |
| 4,602,202 A | 7/1986 | Mundschenk et al. |
| 4,607,207 A | 8/1986 | Bruneau |
| 4,667,142 A | 5/1987 | Butler |
| 4,670,701 A | 6/1987 | Sako et al. |
| 4,680,527 A | 7/1987 | Benenati et al. |
| 4,724,189 A | 2/1988 | Chase |
| 4,751,452 A | 6/1988 | Kilmer et al. |
| 4,767,358 A | 8/1988 | Nullmeyer et al. |
| 4,794,059 A | 12/1988 | Hope et al. |
| 4,803,605 A | 2/1989 | Schaller et al. |
| D301,229 S | 5/1989 | Weimann |
| 4,843,298 A | 6/1989 | Brauch et al. |
| 4,871,629 A | 10/1989 | Bunyea |
| 4,873,160 A | 10/1989 | Miyazaki et al. |
| D306,851 S | 3/1990 | Weimann |
| 4,927,021 A | 5/1990 | Taylor |
| 4,960,655 A | 10/1990 | Hope et al. |
| 4,969,206 A | 11/1990 | Desrochers |
| 4,981,490 A | 1/1991 | Machida |
| 5,010,454 A | 4/1991 | Hopper |
| 5,015,546 A | 5/1991 | Dulaney et al. |
| 5,049,091 A | 9/1991 | Tanaka |
| 5,055,986 A | 10/1991 | Johnson |
| 5,061,579 A | 10/1991 | Ishimoto |
| 5,149,603 A | 9/1992 | Fleming et al. |
| 5,153,495 A | 10/1992 | Connors |
| 5,168,206 A | 12/1992 | Jones |
| 5,172,043 A | 12/1992 | Toops |
| 5,173,371 A | 12/1992 | Huhndorff et al. |
| 5,177,424 A | 1/1993 | Connors |
| 5,180,644 A | 1/1993 | Bresin et al. |
| 5,187,026 A | 2/1993 | Scrivano |
| 5,188,869 A | 2/1993 | Getz et al. |
| 5,191,275 A | 3/1993 | Singhal |
| 5,192,904 A | 3/1993 | Leiserson |
| 5,200,687 A | 4/1993 | Lindblom et al. |
| 5,200,883 A | 4/1993 | Kobayashi |
| 5,204,610 A | 4/1993 | Pierson et al. |
| 5,212,020 A | 5/1993 | Inobe |
| 5,223,003 A | 6/1993 | Tucholski et al. |
| 5,225,294 A | 7/1993 | Schifrin |
| 5,225,760 A | 7/1993 | Leiserson |
| 5,227,261 A | 7/1993 | Georgopoulos |
| 5,229,220 A | 7/1993 | Stanton et al. |
| 5,237,257 A | 8/1993 | Johnson et al. |
| 5,239,451 A | 8/1993 | Menke et al. |
| 5,260,636 A | 11/1993 | Leiserson et al. |
| 5,277,993 A | 1/1994 | Landers |
| 5,298,347 A | 3/1994 | Aksoy et al. |
| 5,316,873 A | 5/1994 | Scrivano |
| 5,340,662 A | 8/1994 | McCarter |
| 5,357,411 A | 10/1994 | Menke et al. |
| 5,396,162 A | 3/1995 | Brilmyer |
| 5,407,444 A | 4/1995 | Kroll |
| 5,412,547 A | 5/1995 | Hornblad et al. |
| 5,422,201 A | 6/1995 | Georgopoulos |
| 5,426,358 A | 6/1995 | Leiserson et al. |
| 5,431,575 A | 7/1995 | Engira |
| 5,432,017 A | 7/1995 | Hassemer et al. |
| 5,436,088 A | 7/1995 | Castaneda et al. |
| 5,446,633 A | 8/1995 | Hanggi |
| 5,464,709 A | 11/1995 | Gertz et al. |
| 5,475,626 A | 12/1995 | Viletto |
| 5,489,485 A | 2/1996 | Peot et al. |
| 5,504,412 A | 4/1996 | Chan et al. |
| 5,508,123 A | 4/1996 | Fan |
| 5,525,888 A | 6/1996 | Toya |
| 5,545,935 A | 8/1996 | Stewart |
| 5,568,038 A | 10/1996 | Tatsumi |
| 5,570,948 A | 11/1996 | Menke et al. |
| 5,589,288 A | 12/1996 | Coulson et al. |
| 5,592,069 A | 1/1997 | Dias et al. |
| 5,602,454 A | 2/1997 | Arakawa et al. |
| 5,633,574 A | 5/1997 | Sage |
| 5,652,496 A | 7/1997 | Pilaryzk et al. |
| 5,654,870 A | 8/1997 | Havener |
| 5,661,392 A | 8/1997 | Imazeki |
| 5,667,912 A | 9/1997 | Georgopolos |
| 5,694,293 A | 12/1997 | Seto et al. |
| 5,733,674 A * | 3/1998 | Law et al. ......................... 429/9 |
| 5,786,106 A | 7/1998 | Armani |
| 5,793,187 A | 8/1998 | DeBauch |
| 5,795,053 A | 8/1998 | Pierce |
| 5,816,689 A | 10/1998 | Strazzabosco |
| 5,821,010 A | 10/1998 | Taylor |
| 5,826,971 A | 10/1998 | Kibler |
| 5,839,821 A | 11/1998 | LeZotte |
| 5,844,472 A | 12/1998 | Lee |
| 5,853,241 A | 12/1998 | Sharrah et al. |
| 5,854,549 A | 12/1998 | Paulick |
| 5,865,525 A | 2/1999 | Kibler et al. |
| 5,872,831 A | 2/1999 | Zoiss et al. |
| 5,909,062 A | 6/1999 | Kreitzman |
| 5,911,497 A | 6/1999 | Mele |
| 5,932,371 A | 8/1999 | Tucholski |
| 5,933,496 A | 8/1999 | McKinnon |
| 5,973,476 A | 10/1999 | Irvin |
| 5,977,746 A | 11/1999 | Hershberger |
| 5,980,310 A | 11/1999 | Bourel et al. |
| 5,993,992 A | 11/1999 | Field et al. |
| 6,014,009 A | 1/2000 | Wierzbicki et al. |
| 6,022,639 A | 2/2000 | Urry |
| 6,023,147 A | 2/2000 | Cargin, Jr. et al. |
| 6,027,830 A | 2/2000 | Lindner |
| 6,034,318 A | 3/2000 | Lycke et al. |
| 6,034,508 A | 3/2000 | Chang |
| 6,049,141 A | 4/2000 | Sieminski et al. |
| 6,103,424 A | 8/2000 | Hama |
| 6,104,162 A * | 8/2000 | Sainsbury et al. ............. 320/111 |
| 6,154,010 A | 11/2000 | Geiger |
| 6,160,702 A | 12/2000 | Lee et al. |
| 6,161,938 A | 12/2000 | Kish et al. |
| 6,181,067 B1 | 1/2001 | Dalton |
| 6,187,470 B1 | 2/2001 | Peterson |
| 6,206,938 B1 | 3/2001 | Tucholski |
| 6,265,101 B1 | 7/2001 | Tucholski |
| 6,271,644 B1 * | 8/2001 | Okada et al. ................... 320/112 |
| 6,274,266 B1 * | 8/2001 | Wang ............................. 429/163 |
| 6,285,159 B1 | 9/2001 | Ki et al. |
| 6,300,004 B1 | 10/2001 | Tucholski |
| 6,303,248 B1 | 10/2001 | Peterson |
| 6,312,850 B1 | 11/2001 | Janmey |
| 6,326,766 B1 | 12/2001 | Small |
| 6,326,767 B1 | 12/2001 | Small et al. |
| 6,380,713 B2 | 4/2002 | Namura |
| 6,404,164 B1 | 6/2002 | Bean et al. |
| 6,437,536 B2 | 8/2002 | Higuchi |
| 6,457,841 B1 | 10/2002 | Lynch et al. |
| 6,459,175 B1 | 10/2002 | Potega |
| 6,479,962 B2 | 11/2002 | Ziemkowski et al. |
| 6,479,963 B1 | 11/2002 | Manor et al. |
| 6,489,751 B2 | 12/2002 | Small et al. |
| 6,505,952 B1 | 1/2003 | Kish et al. |
| 6,521,363 B1 | 2/2003 | Yeh |
| 6,528,210 B1 | 3/2003 | Oertel et al. |
| 6,530,114 B2 | 3/2003 | Bailey et al. |
| 6,563,269 B2 | 5/2003 | Robinett et al. |
| 6,586,134 B2 | 7/2003 | Skoumpris |
| 6,586,850 B1 | 7/2003 | Powers |
| 6,589,693 B1 | 7/2003 | Kilby et al. |
| 6,600,291 B2 | 7/2003 | Pautet et al. |
| 6,624,616 B1 | 9/2003 | Frerking et al. |
| 6,646,414 B2 | 11/2003 | Small |
| 6,677,078 B2 | 1/2004 | Reise et al. |
| 6,713,988 B2 | 3/2004 | Dubac et al. |
| 6,722,771 B1 | 4/2004 | Stephens |
| 6,743,548 B2 | 6/2004 | Cheiky et al. |
| 6,777,910 B2 | 8/2004 | Small |
| 6,784,568 B2 | 8/2004 | Powers |
| D496,482 S | 9/2004 | Osiecki et al. |

| | | |
|---|---|---|
| 6,789,917 B2 | 9/2004 | Parsons et al. |
| 6,806,681 B1 | 10/2004 | Cheiky et al. |
| 6,809,499 B2 | 10/2004 | Solingen |
| 6,851,828 B1 | 2/2005 | Hansen |
| 6,876,173 B2 * | 4/2005 | Mastaler et al. ............... 320/114 |
| 6,877,878 B2 | 4/2005 | Raskas |
| 6,883,199 B1 | 4/2005 | Lundell et al. |
| 6,913,370 B2 | 7/2005 | Ping |
| 6,933,703 B2 | 8/2005 | Dubac et al. |
| 6,966,669 B2 | 11/2005 | Hussaini et al. |
| D516,502 S | 3/2006 | Small |
| 7,038,333 B2 | 5/2006 | Bourikov et al. |
| 7,127,623 B2 | 10/2006 | Potega |
| 7,176,656 B2 | 2/2007 | Feldmann |
| 7,203,986 B2 | 4/2007 | Pears et al. |
| 7,215,084 B1 | 5/2007 | Sharrah et al. |
| 7,423,407 B2 * | 9/2008 | Watson et al. ............... 320/114 |
| 7,602,150 B2 * | 10/2009 | Kazama et al. ............... 320/133 |
| 2002/0046437 A1 | 4/2002 | Bailey et al. |
| 2002/0067143 A1 | 6/2002 | Robinett et al. |
| 2002/0067608 A1 | 6/2002 | Kruse et al. |
| 2002/0130634 A1 | 9/2002 | Ziemkowski et al. |
| 2003/0026103 A1 | 2/2003 | Reese et al. |
| 2003/0151914 A1 | 8/2003 | Kish et al. |
| 2003/0155887 A1 | 8/2003 | Bourikov et al. |
| 2003/0193245 A1 | 10/2003 | Powers |
| 2003/0193314 A1 | 10/2003 | Solingen |
| 2004/0179361 A1 | 9/2004 | Hussani et al. |
| 2002/3928704 | 12/2004 | Batt-Gowins |
| 2004/0253500 A1 * | 12/2004 | Bourilkov et al. ............... 429/34 |
| 2004/0257034 A1 * | 12/2004 | Moayer et al. ............... 320/107 |
| 2005/0210679 A1 | 9/2005 | Moulton, III |
| 2005/0235439 A1 | 10/2005 | Braun et al. |
| 2005/0239287 A1 | 10/2005 | Smith |
| 2005/0264261 A1 | 12/2005 | Barbeau et al. |
| 2006/0005055 A1 | 1/2006 | Potega |
| 2006/0006838 A1 | 1/2006 | Clarke |
| 2006/0028811 A1 | 2/2006 | Ross, Jr. et al. |
| 2006/0103543 A1 | 5/2006 | Chen et al. |
| 2006/0108970 A1 | 5/2006 | Leasure et al. |
| 2006/0171144 A1 | 8/2006 | Yuen |
| 2006/0176017 A1 | 8/2006 | Waguespack |
| 2006/0262525 A1 | 11/2006 | Barbeau et al. |
| 2006/0272112 A9 | 12/2006 | Braun et al. |
| 2007/0014105 A1 | 1/2007 | Naguchi et al. |
| 2007/0080663 A1 | 4/2007 | Obering |

FOREIGN PATENT DOCUMENTS

| | | |
|---|---|---|
| EP | 0394074 | 10/1990 |
| EP | 0569354 | 8/1992 |
| EP | 0533598 | 3/1993 |
| EP | 0562723 | 9/1993 |
| EP | 00788172 | 8/1997 |
| EP | 1136746 | 9/2001 |
| EP | 1347531 | 9/2003 |
| GB | 2239567 | 7/1991 |
| GB | 2251515 | 7/1992 |
| WO | 9016088 | 12/1990 |
| WO | 9946844 | 9/1999 |
| WO | 0052779 | 9/2000 |
| WO | 0054359 | 9/2000 |
| WO | 03071651 | 8/2003 |
| WO | 03087653 | 10/2003 |
| WO | 2004008020 | 1/2004 |
| WO | 2006056744 | 6/2006 |

* cited by examiner

FIG. 1
FIG. 2
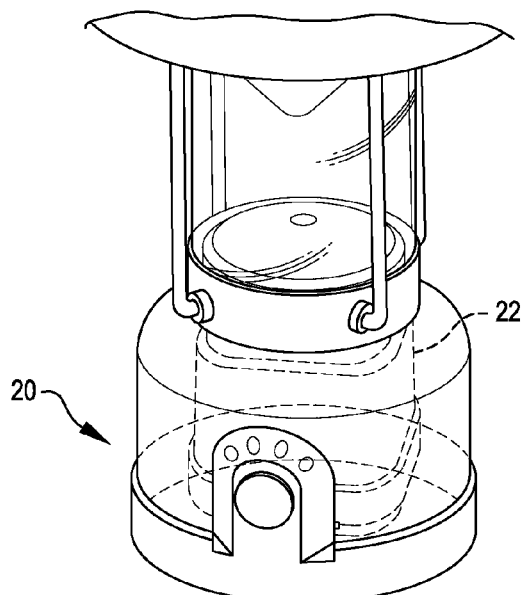
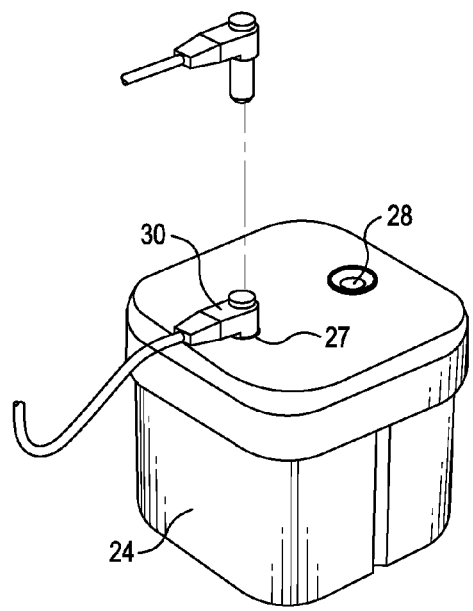
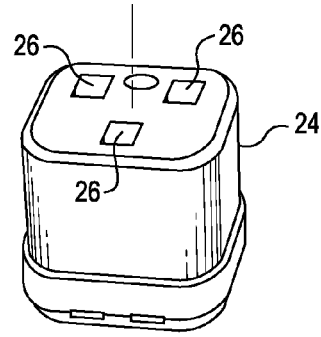
FIG. 3
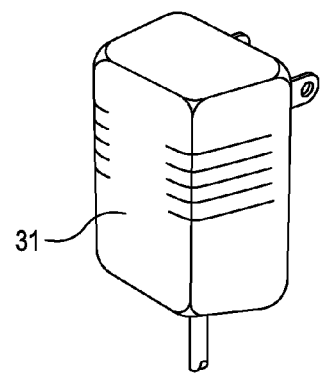
FIG. 4
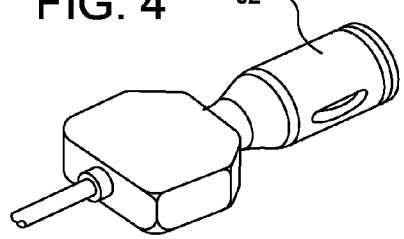

ELECTRICAL APPLIANCE THAT UTILIZES MULTIPLE POWER SOURCES

REFERENCE TO RELATED APPLICATIONS

The present application claims priority to U.S. provisional patent application Ser. No. 60/946,230, filed Jun. 26, 2007, and incorporated herein by reference.

BACKGROUND OF THE INVENTION

A number of different electrical appliances utilize rechargeable battery packs for power. For example, electrical drills and saws and other electrical power tools very often utilize a rechargeable battery pack for power. A user may own more than one rechargeable battery pack so that a fresh battery pack may be installed while a spent battery pack is recharged.

Although rechargeable battery packs work well for their intended purpose, a fully recharged replacement battery pack may not be available. In addition, a user may be in a setting, such as a campsite, where power for a charger is not available.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description of some embodiments that are presented later.

In accordance with an embodiment, an electrical appliance accepts multiple different self-contained power sources. As an example, an electrical appliance may receive a rechargeable battery pack or a power cartridge that is designed to receive disposable batteries. If the user does not have sufficient power left in a battery pack, the power cartridge may be filled with disposable dry cell batteries, and may be inserted in the electrical appliance to provide power.

In accordance with an embodiment, another self contained power cartridge may include a fuel cell. The fuel cell power cartridge may include removable fuel cell cartridges, for example, each having a fuel therein, such as hydrogen.

Other features of the invention will become apparent from the following detailed description when taken in conjunction with the drawings, in which:

BRIEF DESCRIPTION OF THE DRAWINGS

FIG. 1 is a side perspective view of an electrical appliance with a power cartridge being inserted therein;

FIG. 2 is a bottom view of the power cartridge of FIG. 1, with a adapter jack installed in the power cartridge for recharging of the power cartridge;

FIG. 3 is a side perspective view of an AC/DC adapter for charging the power cartridge of FIG. 2;

FIG. 4 is a side perspective view of a 12-volt car adapter for charging the power cartridge of FIG. 2;

DETAILED DESCRIPTION

Figure 5:
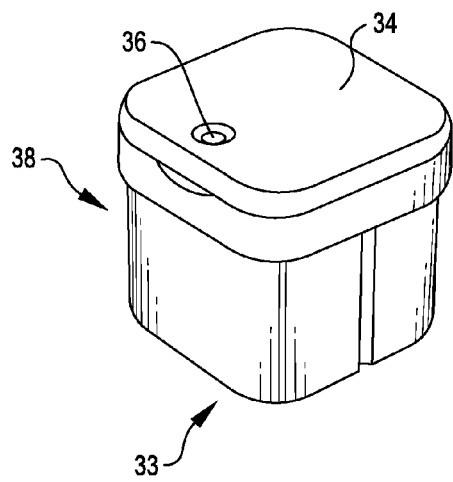
FIG. 5 is a side perspective view of a disposable battery power cartridge in accordance with an embodiment.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described. In addition, to the extent that orientations of the embodiments are described, such as "top," "bottom," "front," "rear," "right," and the like, the orientations are to aid the reader in understanding the embodiment being described, and are not meant to be limiting.

In accordance with an embodiment, multiple different self-contained power sources, or cartridges are configured to be received in and used by an electrical appliance. In the embodiment shown in the drawings, the electrical appliance is a lantern 20, but other electrical appliances may utilize features of the present invention. As non-limiting examples, power tools, such as drills or saws, may benefit from the multiple self-contained power sources described herein. In addition, other portable electrical appliances, such as flashlights, portable refrigerators, portable fans and pumps may utilize the multiple power sources.

As used herein, a "self-contained" power cartridge or source is a power cartridge or source that supplies electrical current on its own, independent of external sources of power. For example, a self-contained power source would not need to be plugged into an AC outlet to supply power.

In the embodiment shown in the drawings, the lantern 20 includes a cavity 22 for receiving a power cartridge, such as a rechargeable power cartridge 24. The cavity 22 includes contacts (not shown, but known in the art) for engaging contacts 26 on the rechargeable power cartridge 24 when the rechargeable power cartridge 24 is inserted in the cavity 22.

Rechargeable power cartridges, such as the rechargeable power cartridge 24, are known, and are often called "rechargeable battery packs." Thus, details of their construction and composition are not given here. As examples, the rechargeable power cartridge 24 may utilize SLA (sealed lead acid), NiMH (nickel-metal hydride), NiCd (nickel-cadmium), or lithium ion rechargeable batteries.

A bottom side of the rechargeable power cartridge 24 is shown in FIG. 2. The rechargeable power cartridge 24 includes a plug 27 and a light 28. The light 28 may be used, for example, to show that the rechargeable power cartridge 24 is fully charged. The plug 27 is adapted to receive an adapter jack 30 for charging the rechargeable power cartridge 24. The adapter jack 30 may be attached to an AC/DC adapter 31 (FIG. 3) or a 12-volt car adapter 32 (FIG. 4), as examples.

The rechargeable power cartridge 24 is configured to fit within the cavity 22, and may snap or otherwise lock into place within the cavity. In alternate embodiments, the rechargeable power cartridge 24 may fit on an outside of an electrical appliance, may include a protrusion that fits inside a cavity on an electrical appliance, or may connect to an electrical appliance in another way. In general, however, the rechargeable power cartridge 24 includes contacts, such as the contacts 26, that engage contacts on the electrical appliance and through which the electrical appliance may be supplied power from the rechargeable power cartridge.

Figure 6:
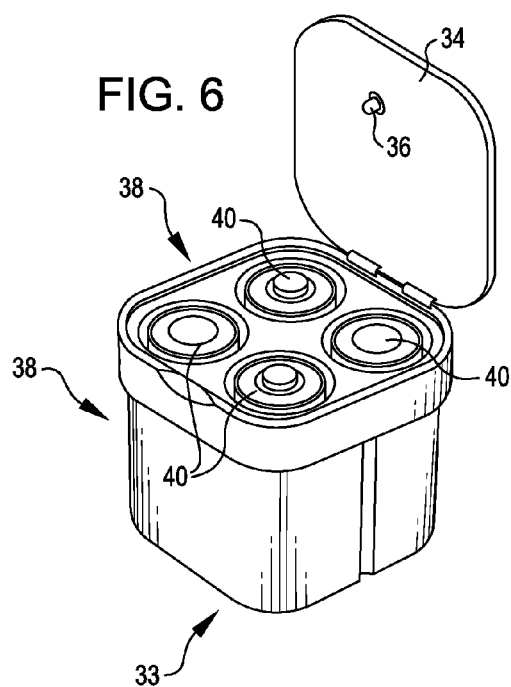
FIG. 6 is a side perspective view of the disposable battery power cartridge of FIG. 5, with a lid open to show batteries therein.

In accordance with an embodiment, as shown in FIGS. 5 and 6, a disposable battery cartridge 33 is provided that may be used in place of the rechargeable power cartridge 24. The disposable battery power cartridge 33 preferably includes contacts similar to the contacts 26. In addition, the disposable battery power cartridge 33 is preferably sized similar to, or identical to, the rechargeable power cartridge 24 so that the disposable battery power cartridge 33 also fits into the cavity 22 of the lantern 20. If a locking or snap-in feature is provided for the rechargeable power cartridge 24, a similar locking or snap-in feature may be provided for the disposable battery power cartridge 33.

As can be seen in FIG. 6, the disposable battery power cartridge 33 includes a hinged lid 34 that may be connected by a fastener 36 (FIG. 5) and/or a snap feature when closed. The lid 34 closes a compartment 38 for the disposable battery power cartridge 33. The compartment 38 is designed to receive disposable dry cell batteries 40, such as four D-cell disposable batteries. A disposable battery power cartridge 33 may be designed to fit any number of batteries, including only one battery.

When the lid 34 is closed, the batteries 40 in the compartment 38 are connected by a conventional circuit to the contacts on the outside of the disposable battery power cartridge 33. In addition, if needed, a disposable battery power cartridge may include a rheostat or other appropriate device for regulating current supplied by the disposable battery power cartridge 33 to contacts on the outside of the disposable battery power cartridge 33.

In an embodiment, the disposable battery cartridge 33 provides six volts via the four disposable dry cell batteries 40. In an embodiment, six volts is also the normal operating voltage of the rechargeable power cartridge 24. Thus, the rechargeable power cartridge 24 may be removed from the lantern 20 and replaced with the disposable battery power cartridge 33, without need for alteration of the lantern 20. In this manner, a user may have another power cartridge readily available, without having to charge and/or own an additional rechargeable power cartridge 24. The user may use the disposable battery power cartridge 33 while the rechargeable power cartridge 24 is recharged. Alternatively, a user may continue to use the disposable battery cartridge 33, and replace the dry cell batteries 40 when needed. In addition, a user may select to use only dry cell batteries 40 with an appliance (e.g., the lantern 20).

Figure 7:
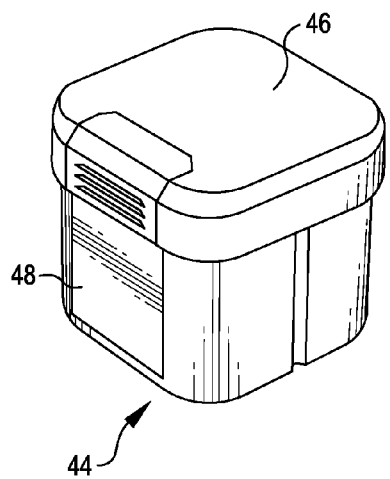
FIG. 7 is a side perspective view of a fuel cell power cartridge in accordance with an embodiment.
Figure 8:
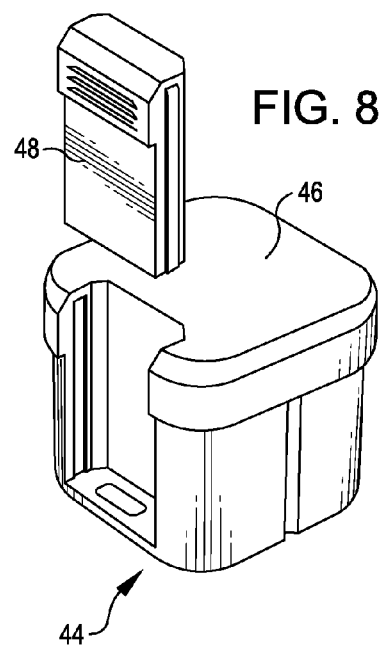
FIG. 8 is an exploded side perspective view of the fuel cell power cartridge of FIG. 7.

In accordance with another embodiment, as shown in FIGS. 7 and 8, a fuel cell power cartridge 44 may be utilized in an electrical appliance, such as the lantern 20. The fuel cell power cartridge 44 includes a housing 46 having a fuel cell (not shown) mounted therein. As is known, a fuel cell is an electrochemical conversion device. It produces electricity from various external quantities of fuel (on the anode side) and an oxidant (on the cathode side). These react in the presence of an electrolyte. Fuel cells can operate virtually continuously as long as the necessary flows are maintained.

In the embodiment shown in the drawings, the fuel cell is provided fuel by a refillable fuel cell cartridge 48. This refillable fuel cell cartridge 48 may include, for example, hydrogen fuel for use in powering the fuel cell power cartridge 44. The refillable fuel cell cartridge 48 may be, for example, a metal hydride cartridge for storing hydrogen typically found in polymer electrolyte membrane (PEM) type fuel cells, or a methanol/water mixture typically found in direct methanol fuel cell (DMFC) type fuel cells.

In the embodiment shown in the drawings, the fuel cell power cartridge 44 may be placed inside the cavity 22 of the lantern 20 to provide power for the lantern. The fuel cell power cartridge 44 thus provides an alternative power source for an appliance such as the lantern 20.

Other power sources may be provided, including a cartridge that is directly connected to an AC power source, such as a plug. The self-contained power sources described herein, however, are advantageous in that an appliance utilizing the self-contained power sources may be fully portable, without being tethered to an AC power source.

In addition, in accordance with an embodiment, an appliance, such as the lantern 20, may be configured to receive different sizes of cartridges and/or power sources. As one example, the lantern 20 may have an opening, separate from the cavity 22, that is sized to directly receive disposable dry cell batteries. Alternatively, the cavity 22 may be sized to directly receive disposable dry cell batteries.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power source for an electrical appliance, the electrical appliance comprising a recess comprising power contacts and the recess for receiving a rechargeable battery pack, the power source comprising:
a fuel cell power cartridge that includes a fuel cell cartridge removably received therein and first contacts, the fuel cell cartridge, when received in the fuel cell power cartridge, providing power to the first contacts, and the fuel cell power cartridge fitting in the recess with the first contacts connecting to the power contacts to provide power to the electrical appliance, the fuel cell cartridge being refillable with fuel.

2. The power source of claim 1, wherein the refillable fuel cell cartridge stores hydrogen.

3. The electrical appliance of claim 1, wherein the cavity includes a first locking feature associated therewith for releasably locking the rechargeable battery pack therein utilizing a second locking feature on the rechargeable battery pack, and wherein the fuel cell power cartridge comprises a second locking feature.

4. The power source of claim 1, wherein the electrical appliance is a lantern.

* * * * *